United States Patent [19]
Bennett et al.

[11] Patent Number: 5,700,118
[45] Date of Patent: Dec. 23, 1997

[54] WALL AND LOGISTICS TRACK CONSTRUCTION FOR A REFRIGERATED VEHICLE

[75] Inventors: Paul F. Bennett; John P. Adams; Arturo C. Gomez, all of City of Industry, Calif.

[73] Assignee: Utility Trailer Manufacturing Company, City of Industry, Calif.

[21] Appl. No.: 619,173

[22] Filed: Mar. 21, 1996

[51] Int. Cl.[6] ........................................ B60P 7/135
[52] U.S. Cl. ..................... 410/113; 296/183; 296/901; 52/783.19
[58] Field of Search ........................... 296/24.1, 181, 296/183, 191, 901; 410/102, 104, 105, 108, 109, 113, 114, 115; 105/404, 409; 52/309.7, 309.9, 309.11, 309.14, 309.16, 783.19, 794.1; 220/1.5

[56] References Cited

U.S. PATENT DOCUMENTS

| | | | |
|---|---|---|---|
| 2,858,580 | 11/1958 | Thompson et al. | 296/181 |
| 3,815,500 | 6/1974 | Glassmeyer | 296/183 X |
| 3,842,755 | 10/1974 | Carr | 296/183 X |

FOREIGN PATENT DOCUMENTS

| | | | |
|---|---|---|---|
| 3316412 | 11/1984 | Germany | 296/181 |

*Primary Examiner*—Andrew C. Pike
*Attorney, Agent, or Firm*—Lyon & Lyon LLP

[57] ABSTRACT

An insulated and logistics track construction for the side and end walls of a refrigerated vehicle includes an exterior metal sheet attached to a plurality of vertical posts that are horizontally spaced. An interior sheet of fiber reinforced plastic (FRP) is spaced from the exterior sheet and attached to the vertical posts by a logistics track attached to each post with the FRP interior sheet captured between the logistics track and post. The logistics track is shorter than the posts, thereby leaving portions of the FRP interior sheet above and below the logistics tracks unattached and unrestrained by the posts. A mandrel with vertical tubes is positioned adjacent the FRP interior sheet while foam is introduced between the exterior sheet and the interior sheet and the pressure of the foam forces the FRP interior sheet to create a flat inner surface between the vertically extending logistics tracks with the logistics tracks recessed below the flat inner surface and to create a corrugated shape in the surface of the FRP interior sheet above and below the logistics tracks.

23 Claims, 6 Drawing Sheets

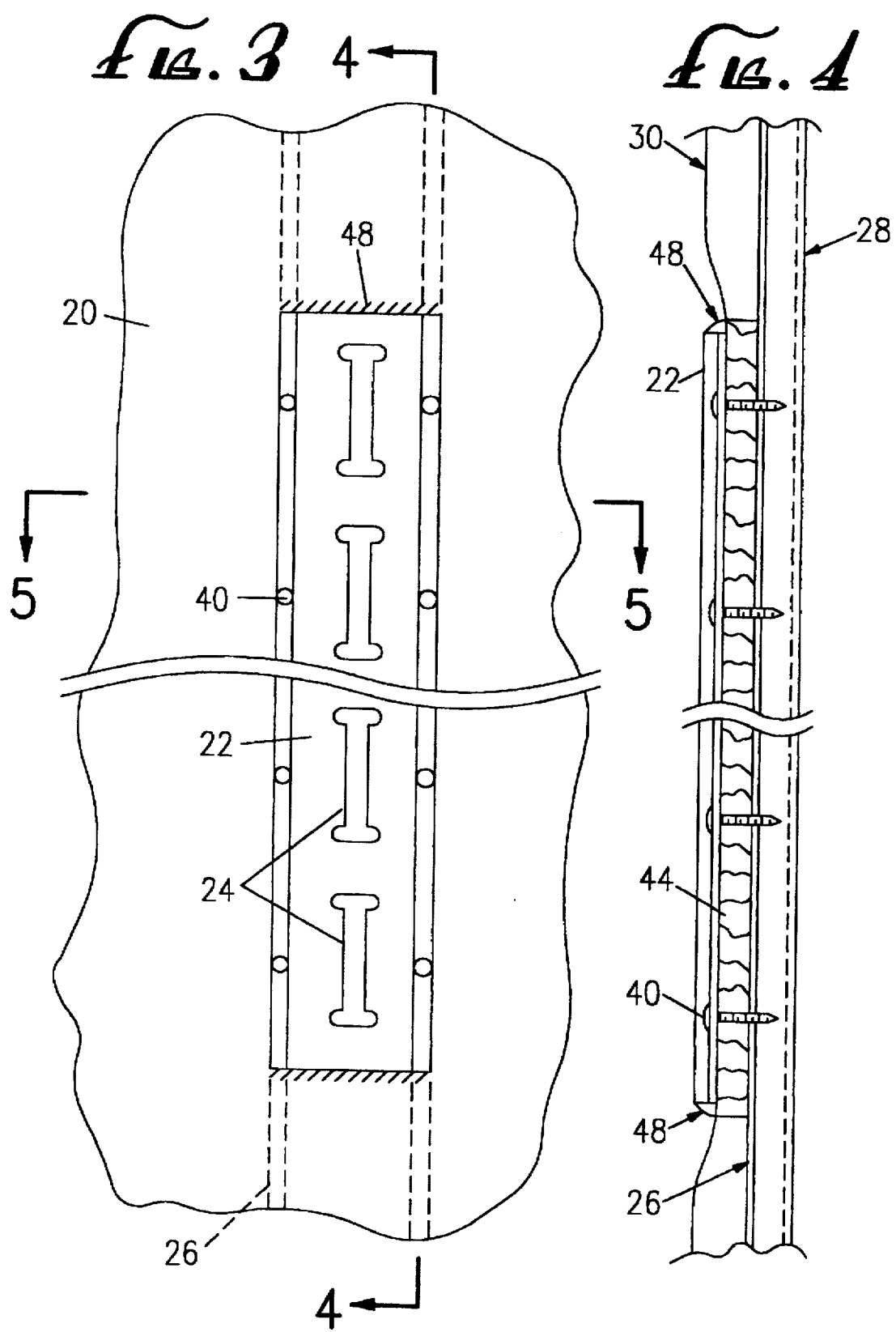

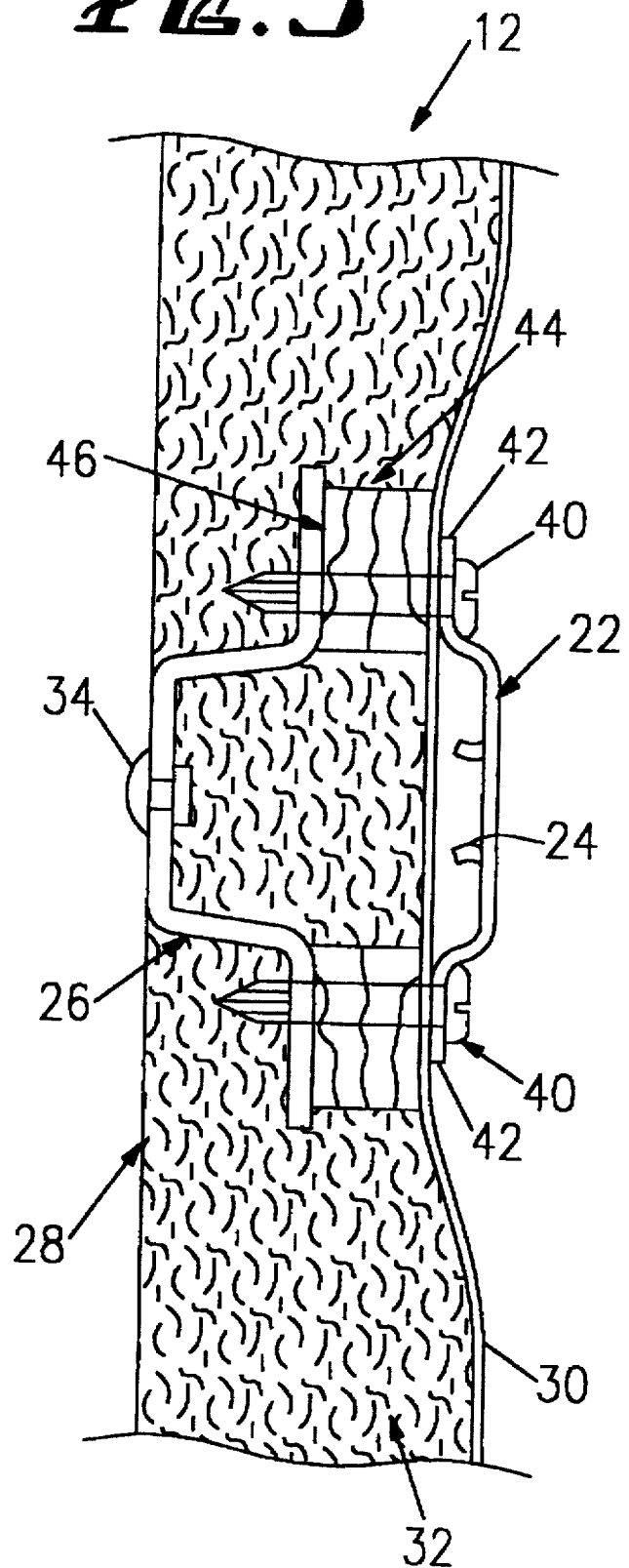

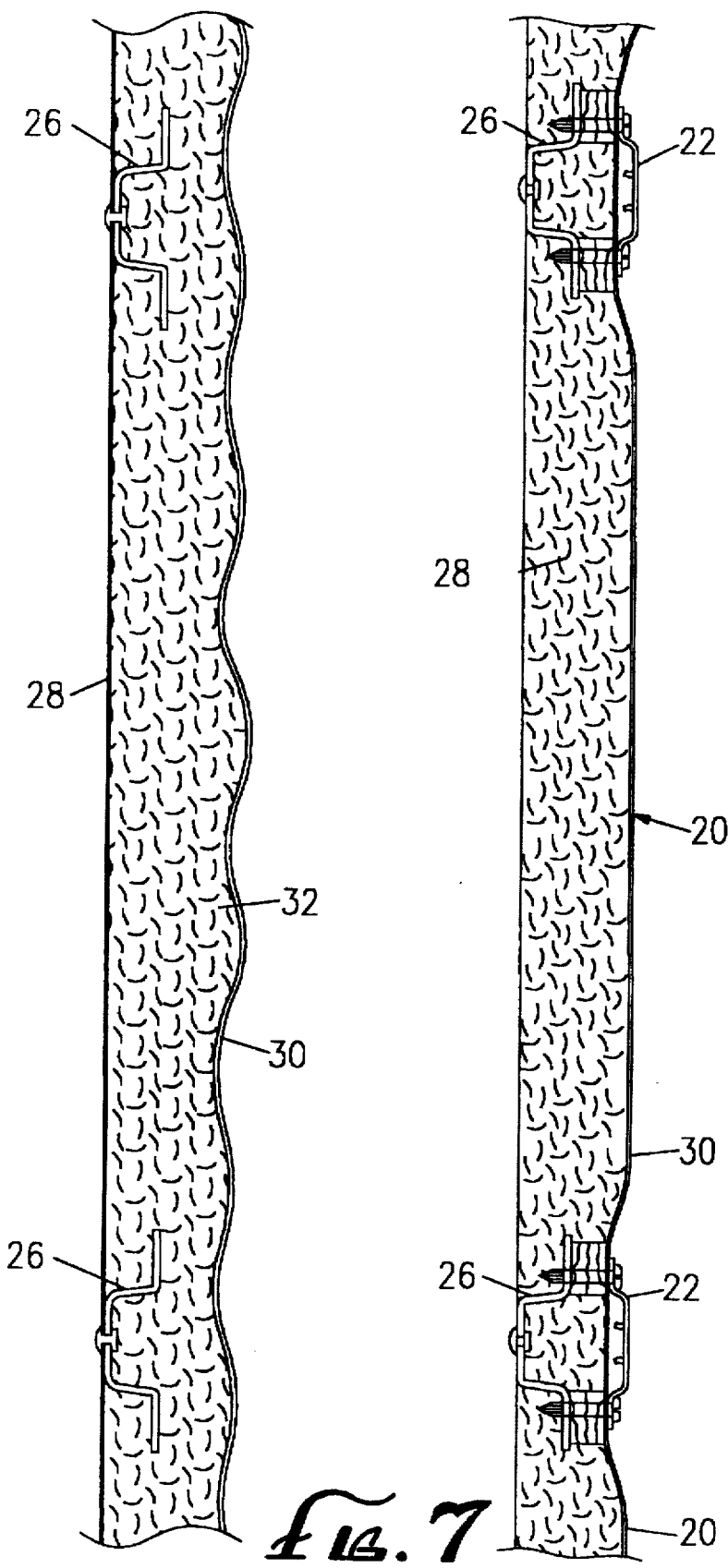

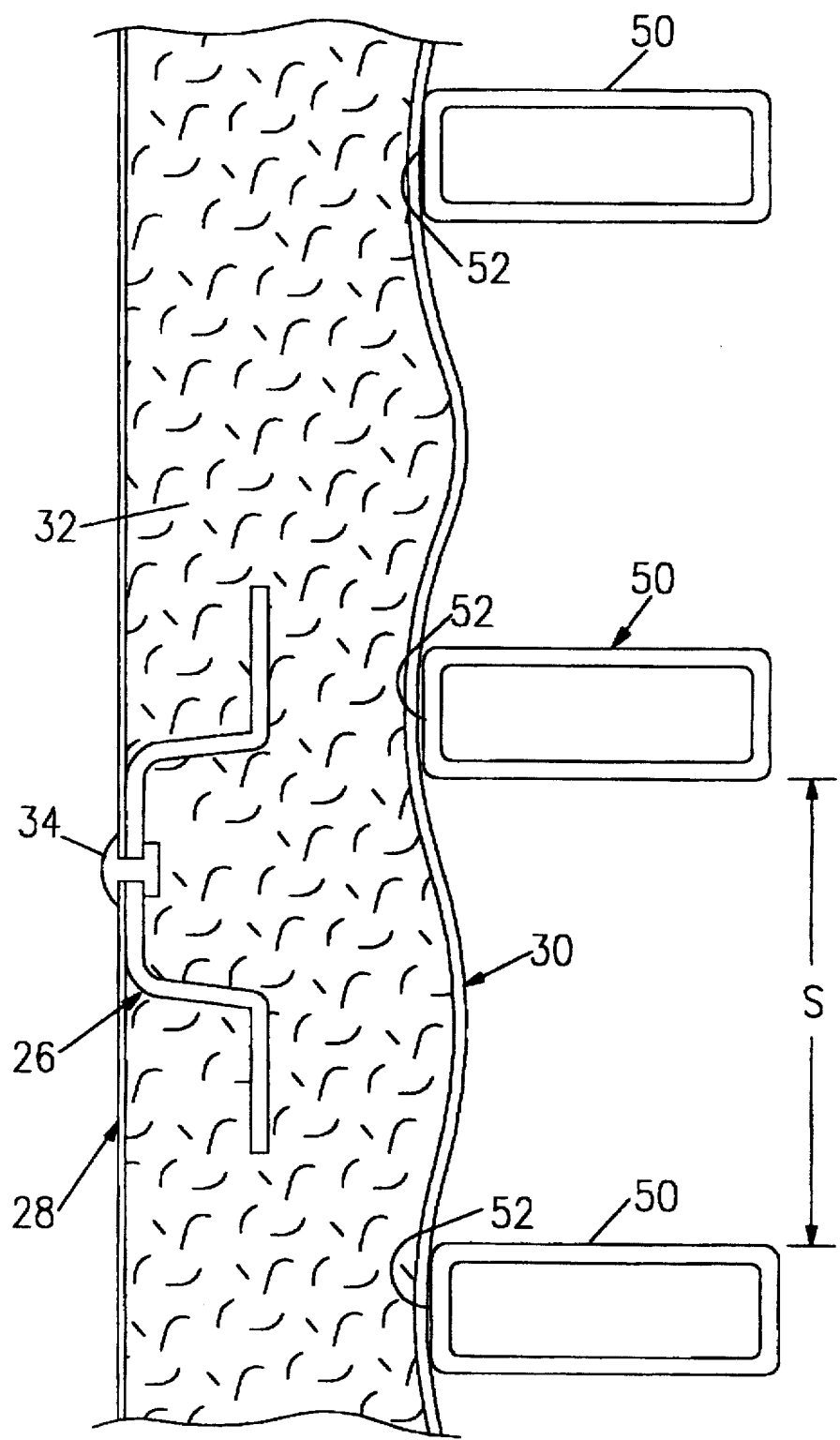

WALL AND LOGISTICS TRACK CONSTRUCTION FOR A REFRIGERATED VEHICLE

This invention relates to a refrigerated vehicle for carrying perishable cargo and, in particular, to the construction of the sidewalls of the vehicle with internal logistics tracks for use in securing or supporting the cargo.

The use of logistics tracks on the interior walls of cargo vehicles, such as trucks and trailers, is well known as shown in U.S. Pat. No. 3,842,755, Freight Bracing and Loading Apparatus, inventor, George W. Carr. A logistics track is an elongated structural member that includes a series of spaced holes or slots of a particular shape, such as the I-shaped slots in the Carr patent, for receiving complimentary-shaped fittings attached to straps or braces for supporting or confining the cargo. The logistics tracks must be sufficiently strong to restrain or support the cargo that is engaged by the straps or braces and may be formed as a part of the wall-supporting posts, as disclosed in the Carr patent. It is highly desirable that the logistics tracks be flush with the interior surface of the wall of the vehicle to avoid being an obstruction and being damaged during loading and unloading of cargo.

In refrigerated vehicles the walls, as well as the floor and ceiling, must be of an insulating construction to keep the cargo cold and therefore it is common to use a composite wall of interior and exterior sheets with insulating foam therebetween. Moreover, it is common and desirable to use a material for the interior sheet that is thermally insulating, such as wood or plastics, rather than thermally conductive, such as aluminum which is normally used for the exterior sheeting. However, the interior sheeting of plastic has insufficient strength to also comprise a logistics track, and forming openings in the plastic for access to a logistics track behind the interior sheet of plastic severely weakens the plastic interior wall.

In some refrigerated vehicles, the interior sidewall of the vehicle has been formed by a single sheet of fiberglass reinforced plastic ("FRP") which has good thermal insulating characteristics and sufficient strength and toughness to withstand the loading, unloading, and carrying of cargo, and the single sheet avoids any seams or weaknesses. The FRP sheet is supported by a mandrel from the interior of the vehicle during pressurized foaming of the space between the interior and exterior sheets to produce a composite wall of the desired thickness and insulating characteristics. The wall has a substantially smooth interior surface because of the stiffness of the FRP sheet and the fact that it is supported during foaming. However, the inclusion of logistics tracks with such a wall construction has been difficult, although horizontal logistics tracks have been successfully included by attaching the logistics tracks to the vertical posts in a recessed relationship relative to the interior FRP sheet without disturbing the lengthwise integrity of the FRP sheet.

The principle object of the present invention is to provide a unique insulated wall and vertical logistics track construction for a refrigerated vehicle in which a plurality of vertical logistics tracks are mounted on vertical posts to capture the continuous FRP sheet between each track and post in a recessed or countersunk relationship with respect to the interior surface of the FRP sheet between the logistics tracks with an insulating foam filling the space between the interior FRP sheet and exterior sheet. A further object of this invention is to provide such a wall construction wherein the logistics tracks do not extend from the top to the bottom of the FRP sheet, and the portions of the FRP sheet above and below the logistics tracks are formed in a uniform corrugated manner to accommodate the extra length of the FRP sheet in those portions caused by the countersunk relationship of the FRP sheet at the logistics tracks, which corrugated shape improves the strength and cold air circulating characteristics of the interior of the wall. Another object of this invention is to provide a unique post and logistics track construction that provides adequate strength and preserves the thermal insulation.

Other objects and advantages of this invention will appear from the following description and the accompanying drawings, wherein:

BRIEF DESCRIPTION OF THE DRAWINGS

FIG. 3 is an enlarged fragmentary view of a portion of a logistics track and the wall of this invention;

FIG. 4 is a sectional elevation view taken substantially on the line 4—4 in FIG. 3;

FIG. 5 is a fragmentary sectional plan view taken substantially on the line 5—5 in FIG. 3;

FIG. 6 is a sectional plan view of a portion of the wall and logistics track construction taken substantially on the line 6—6 in FIG. 2;

FIG. 7 is a sectional plan view of another portion of the wall construction taken substantially on the line 7—7 in FIG. 2; and FIG. 8 is a sectional plan view of the wall construction in the same area shown by FIG. 7 and illustrating the interior mandrel used during foaming of the space between the interior and exterior walls.

DETAILED DESCRIPTION OF THE PREFERRED EMBODIMENT

Figure 1:
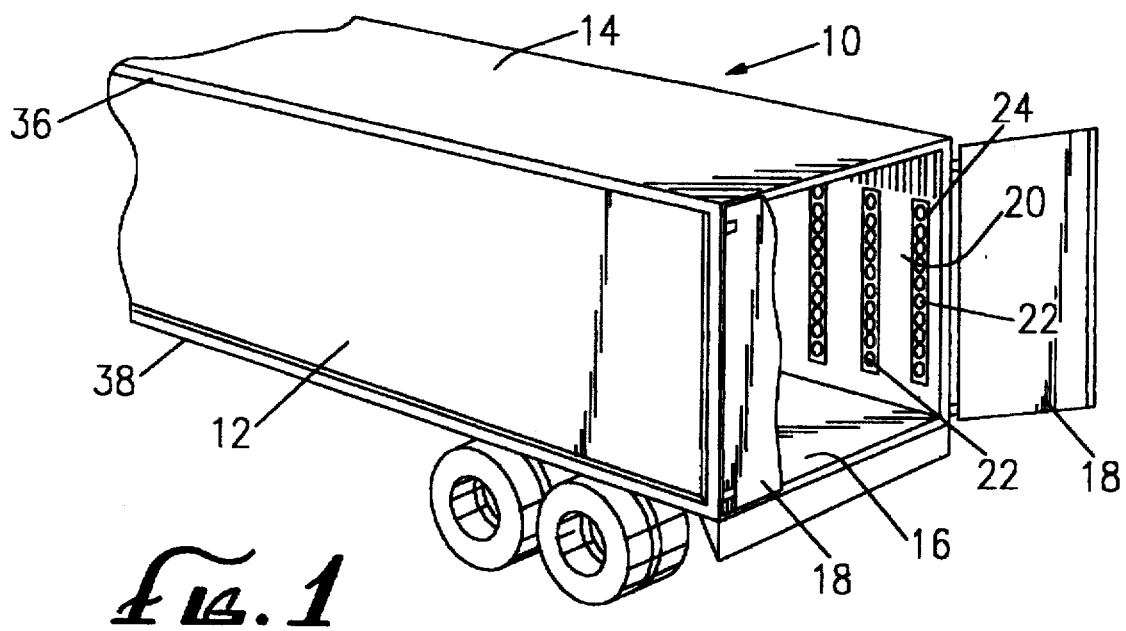
FIG. 1 is a perspective view of a refrigerated vehicle having the wall and logistics track construction of the present invention.
Figure 2:
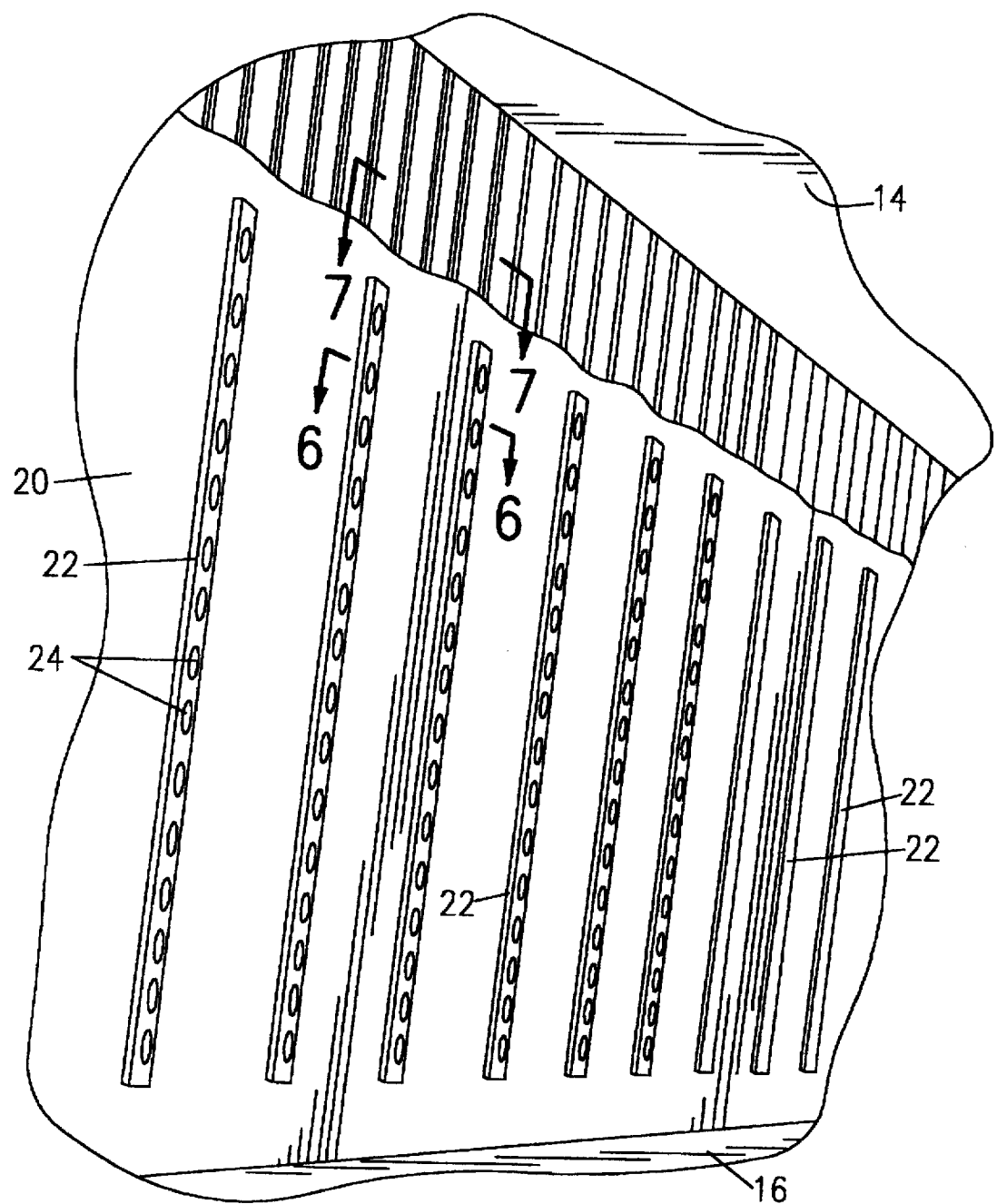
FIG. 2 is a perspective view of a portion of the interior of the wall and logistics track construction of this invention.

Referring now to FIGS. 1 and 2, a refrigerated vehicle 10 has sidewalls 12 on either side, a roof 14, a floor 16, and a rear opening with a pair of doors 18 for providing access to the interior cargo space. The interior surface 20 of the right and left side walls 12 is provided with a plurality of vertically extending logistics tracks 22 in a horizontally spaced relationship along at least a substantial portion of each of the sidewalls 12. Each of the logistics tracks 22 has a plurality of vertically spaced logistics slots 24 which may be of any conventional size and shape, such as an I-shape, as shown in FIG. 3. The front wall (not shown) of the vehicle may be constructed in the same manner as the sidewalls 12 and therefore will not be separately described.

Referring more particularly to FIGS. 3, 4, and 5, each sidewall 12 is comprised of a plurality of horizontally spaced and vertically extending posts 26, exterior panel or sheet 28 attached to the posts 26, interior lining or sheet 30 spaced from the exterior sheet 28, and a foam 32 filling the space between the exterior sheet 28 and interior sheet 30. The post 26 may be of a "hat" shape with a flat top portion to which the exterior sheet 28 is attached by any convenient means, such as rivets 34. The exterior sheet 28 may be comprised of a single sheet extending the length of the vehicle 10 or, more conventionally, comprised of a plurality of separate metal sheets overlapping and riveted together at the posts 26. The interior sheet 30 is preferably a single sheet of fiberglass reinforced plastic (FRP) that is of the length of the interior wall of the vehicle 10 and of a width equal to the height of the interior wall. The FRP material of interior sheet 30 is preferably a durable, semirigid panel comprised of woven and/or random fiberglass impregnated with a plastic such as polyester, and a typical FRP material is known as GLASBORD-L made by Dyrotech Industries, Inc., Joliet, Ill. and available from Crane (Kemlite). The FRP material has a relatively high tensile and flexural strength, a thermal coefficient of expansion similar to aluminum, and a very low thermal conductivity whereby it is desirable material for the interior surface of a refrigerated vehicle with an aluminum exterior panel 28. The vertical posts 26, exterior sheet 28, and interior sheet 30 are attached to a top rail 36 and a bottom rail 38 of the vehicle 10 in a conventional manner to complete the sidewall 12 of the vehicle.

As shown in FIGS. 1 and 2, each logistics track 22 extends only a portion of the total height of the sidewall 12 because normally it is unnecessary to provide strapping or bracing for the cargo at the very bottom or very top of the sidewall. Each logistics track 22 extends vertically along and is attached to the hat-shaped post 26 by any convenient means, such as vertically spaced screws 40 along flanges 42 on either side of the channel-shaped logistics track 22. Preferably, stringers 44 of wood or other insulating material are provided between the post 26 and the logistics track 22 to provide the desired spacing between the exterior and interior sheets 28 and 30 as well as thermally insulating the logistics track 22 from the metal post 26. The screws 40 pass through holes in the wooden stringers 44 and are threaded into holes in the brim portion of the hat-shaped post 26, or any other convenient means may be used for structurally attaching the logistics track 22 to the post 26 for supporting the loads that will be applied by the logistics straps and braces connected to the logistics slots 24 of the logistics track 22. As shown in FIGS. 4 and 5, the FRP interior sheet 30 is captured between the logistics track 22 and post 26, specifically between the logistics track 22 and the wooden stringers 44, and for convenience of assembly, the wooden stringers 44 are preassembled to the brim portions of the hat-shaped post 26 by glue at the surfaces 46. A sealant 48 is used at each vertical end of the logistics track 22 for softening the transition between the logistics track 22 and the FRP interior sheet 30 which is forced to curve inwardly during foaming between the interior and exterior sheets, as will be described below.

Each of the sidewalls is constructed by assembling the posts 26, the exterior sheet 28, the interior sheet 30, the logistics tracks 22, the wooden stringers 44, the top rail 36, the bottom rail 38, the roof 14, and the floor 16 in the manner shown in the drawings and described above before filling the space between the exterior sheet 28 and interior sheet 30 with foam 32. A mandrel is positioned in the interior of the vehicle 10 for supporting the FRP interior sheet 30 during foaming and that mandrel may be comprised of a plurality of vertically extending tubes 50, as shown in FIG. 8. For a typical spacing of the posts 26 of approximately 24 inches on center, a spacing S between tubes 50 of about 3¼ inches has been found satisfactory above and below the logistics tracks 22. A closer or wider spacing may be used above, below and between the logistics tracks 22. The front surface 52 of each tube 50 is located at the desired plane of the finished interior surface 20 of the wall 12, which is essentially the plane of the outer (exposed) surface of the logistics tracks. The tubes 50 are rigidly supported in this position during the foaming process. The foam 32 is injected into the space between the exterior sheet 28 and interior sheet 30 in an amount and with the appropriate pressure to completely fill the space and exert an interior pressure to completely fill the wall. The foam material may be a thermosetting urethane that adheres to the exterior and interior walls 28 and 30 to thereby form a composite wall structure of substantial strength as well as high thermal insulating properties.

Since FRP sheet 30 is relatively stiff with substantial tensile strength and a relatively low coefficient of elongation, when the interior sheet 30 is mounted on the posts 26 by the wooden stringers 44 and logistics tracks 22 spaced along the length of the sheet 30, the sheet 30 is relatively flat from one end of the vehicle to the other and located on a plane essentially between the wooden stringers 44 and logistics tracks 22 before the foaming process.

When the foam 32 is injected into the space between the exterior sheet 28 and interior sheet 30, an internal pressure is created that causes the FRP interior sheet 30 to expand inwardly into engagement with the inner surfaces 52 of the tubes 50, which surfaces 52 are substantially aligned with the inwardly facing innermost surface of the logistics tracks 22 in the area of the logistics tracks 22. A tensile load is applied horizontally on the FRP material of interior sheet 30 as it is forced to stretch inwardly toward the mandrel tubes 50 by the force of the foam 32 and, in so doing, the FRP material resiliently stretches a small amount to engage the inner surfaces 52 of the tubes 50 and thereby create a virtually flat interior surface 20 between adjacent logistics tracks 22 as shown in FIG. 6. In this manner, the logistics tracks 22 become countersunk or recessed in small swale-like depressions in the interior wall and therefore the logistics tracks 22 do not form an obstruction to cargo positioned against or sliding along the interior surface 20.

However, the FRP material of interior sheet 30 vertically above and below the level or position of the logistics tracks 22 is not restrained by the logistics tracks and yet the internal pressure created by the foam 32 forces the FRP material against the inner surfaces 52 of the mandrel tubes 50 and tends to elongate the FRP material in the direction of the length of the vehicle 10. As a result, the FRP material of interior sheet 30 assumes a wavy or corrugated cross section as shown in FIG. 8 during the foaming process, and when the foam has hardened and the mandrel tubes 50 removed, the corrugated shape remains, as shown in FIG. 7. This corrugated shape of the FRP material of interior sheet 30 and the foam 32 adhering to the inside of the FRP material increases the strength of the composite sidewall 12 against bending in the vertical direction. Moreover, the depressions of the wavy corrugated wall provide space for cold air circulation between the wall and flat-sided cargo, thereby enhancing the refrigeration effectiveness of the refrigerated vehicle 10. Similarly, the depressions or swales formed at each of the logistics tracks 22 allow air circulation in the vertical direction past flat-sided cargo positioned against the interior wall 20 and logistics tracks 22.

Thus, an improved sidewall construction for a refrigerated vehicle is formed and has vertical logistics tracks that are recessed at or below the major interior surface formed by the FRP material of the interior sheet 30 of the wall. The logistics tracks and spacing wooden stringers are attached to the structural wall posts of the sidewall whereby the post strength is enhanced by the logistics track and stringers and the logistics track strength is enhanced by the stringers and posts. While the hat-shaped post 26 is the preferred shape, other post shapes may be used. Similarly, while a channel-shaped logistics track with side flanges has been shown as the preferred form, other shapes of logistics tracks may be used. Further, while wooden stringers 44 have been disclosed in this preferred embodiment of the invention, other materials such as plastic may be used that will serve the same spacing and insulating functions or the stringers 44 can be eliminated by using a post of a deeper cross section. While certain materials and dimensions of the components have been specifically disclosed as being preferred, those skilled in the art will readily recognize that other materials and dimensions can be used for obtaining the same advantages as the disclosed embodiment without parting from the spirit of this invention.

What is claimed is:

1. A wall and logistics track construction for a wall of a refrigerated vehicle, the construction comprising:

a plurality of substantially vertical posts spaced along a length of the wall, an exterior sheet connected to said posts and extending along said length of the wall, an interior sheet extending along said length of the wall and spaced from said exterior sheet to form a space between said interior and exterior sheets, an elongated logistics track extending vertically for at least a portion of at least one of said posts and mounted on an interior side of said one post with said interior sheet fixed between said track and said one post, and insulating foam filling said space between said exterior sheet and said interior sheet and causing said interior sheet to be expanded inwardly on both lateral sides of said track in an amount substantially equal to a depth of said track in a direction toward said one post, said interior sheet being substantially flat between said logistics track and an adjacent said logistics track.

2. The wall and logistics track construction of claim 1, wherein each said post has a hat-shaped cross section, each said logistics track has a channel shape with edge flanges, and the construction further comprises fasteners attaching said edge flanges to brim portions of said hat-shaped cross section of said one post.

3. The wall and logistics track construction of claim 2, further comprising a stringer positioned between said one post and said logistics track for insulating and spacing said logistics track from said one post.

4. The wall and logistics track construction of claim 3, wherein said interior sheet is sandwiched between said logistics track and said stringer.

5. The wall and logistics track construction of claim 3, wherein said stringer comprises two pieces of wood.

6. The wall and logistics track construction of claim 1, wherein said interior sheet is a sheet of fiberglass reinforced plastic extending said length of the wall.

7. The wall and logistics track construction of claim 6, wherein a plurality of said logistics tracks are provided with each logistics track attached to a different said post.

8. The wall and logistics track construction of claim 7, wherein each said logistics track is substantially shorter than each said post and is positioned in a midportion of each said post, and said interior sheet above and below said logistics tracks is vertically corrugated.

9. The wall and logistics track construction of claim 8, wherein each said post has a hat-shaped cross section, each said logistics track has a channel shape with edge flanges, and the construction further comprises fasteners attaching said edge flanges to brim portions of said hat-shaped cross section of said posts.

10. The wall and logistics track construction of claim 9, further comprising a stringer positioned between each said post and each said logistics track for insulating and spacing each said logistics track from each said post.

11. A wall and logistics track construction for a wall of a refrigerated vehicle, the construction comprising:

a plurality of substantially vertical posts spaced along a length of the wall, an exterior sheet connected to said posts and extending along said length of the wall, an interior sheet extending along said length of the wall and spaced from said exterior sheet to form a space between said interior and exterior sheets, said interior sheet being comprised of a single sheet of fiberglass reinforced plastic, an elongated logistics track attached to each respective said post and extending vertically for at least a portion of said respective post, each said track being mounted on each said respective post with said interior sheet sandwiched between each said track and each said respective post to which each said track is attached, and insulating foam filling said space between said exterior and interior sheets and causing said interior sheet to bulge inwardly on both lateral sides of each said track in an amount substantially equal to a depth of said track for recessing said tracks below a major interior surface of the wall formed by said interior sheet.

12. The wall and logistics track construction of claim 11, wherein each said logistics track is shorter than a height of said interior sheet and positioned with sheet portions of said interior sheet extending above and below said logistics tracks, said sheet portions being corrugated.

13. A wall and logistics track wall construction for a wall of a refrigerated vehicle formed by a process having the steps of:

attaching an exterior sheet to a plurality of substantially vertical and spaced posts for a length of the wall, positioning an interior sheet along the length of the wall in parallel spaced relationship with said exterior sheet with said posts positioned between said exterior and interior sheets and a space being formed between said interior and exterior sheets, attaching an elongated and vertically extending logistics track to the interior of at least two of said posts with said interior sheet captured and fixed between each said post and attached track, providing an interior support for said interior sheet in spaced relation from said exterior sheet and on an interior plane substantially at an inwardmost surface of said tracks, and introducing an insulating foam in said space between said exterior sheet and said interior sheet in an amount and pressure to fill said space and force said interior sheet to expand inwardly to engage and be supported by said interior support in areas between said tracks and causing said foam to harden for the interior sheet to form a flat interior wall surface between adjacent said tracks with said tracks recessed in said flat interior wall surface.

14. The wall and logistics track construction of claim 13, wherein said interior sheet is a single sheet of fiberglass reinforced plastic extending the length of the wall.

15. The wall and logistics track construction of claim 14, wherein each said logistics track is shorter than a height of said interior sheet and positioned with portions of said interior sheet extending above and below said logistics tracks, said portions being corrugated.

16. The wall and logistics track construction of claim 15, wherein each said post has a hat-shaped cross section, each said logistics track has a channel shape with edge flanges, and fasteners attach said edge flanges to brim portions of said hat-shaped cross section of each said post.

17. The wall and logistics track construction of claim 16, wherein a stringer is positioned between each said post and each said logistics track for insulating and spacing each said logistics track from each said post.

18. The wall and logistics track construction of claim 13, wherein each said post has a hat-shaped cross section, each said logistics track has a channel shape with edge flanges, and fasteners attach said edge flanges to brim portions of said hat-shaped cross section of each said post.

19. The wall and logistics track construction of claim 18, wherein a stringer is positioned between each said post and each said logistics track for insulating and spacing each said logistics track from each said post.

20. In a wall and logistics track construction for a wall of a refrigerated vehicle, wherein a plurality of vertical posts are spaced along a length of the wall and an exterior sheet is connected to the posts and extends the length of the wall, an improvement comprising:

an interior sheet extending the length of the wall and spaced from said exterior sheet to form a space between said interior sheet and the exterior sheet, said interior sheet comprising a single continuous sheet, an elongated logistics track extending vertically for at least a portion of each said post and mounted on an interior side of said post with said interior sheet fixed between said track and said post, and an insulating foam filling said space between the exterior sheet and said interior sheet, wherein each said track is mounted on each said post and stretches said interior sheet toward each said post to cause each said track to be recessed in a swale formed in a flat interior surface formed by said interior sheet.

21. The construction of claim 20 wherein said foam adheres to said interior sheet, the posts, and the exterior sheet to form a composite structure.

22. The construction of claim 20 wherein a spacer means is provided between said interior sheet and each said post for spacing and insulating said post from the interior surface of the wall.

23. The construction of claim 20 wherein each said logistics track is shorter than the posts, and the interior sheet is formed into a corrugated shape above and below the logistics tracks by the foam.

* * * * *